Dec. 20, 1927.  
T. H. THOMAS  
1,653,133

ELECTROPNEUMATIC BRAKE

Filed Feb. 23, 1927

INVENTOR  
THOMAS H. THOMAS  
BY *Wm. M. Cady*  
ATTORNEY

Patented Dec. 20, 1927.

1,653,133

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed February 23, 1927. Serial No. 170,072.

This invention relates to electro-pneumatic brakes and more particularly to a brake equipment for electrically controlling the brakes on a locomotive and cars in a train.

The principal object of my invention is to provide an improved electro-pneumatic brake equipment of the type in which the brakes are controlled by current flow through a single train wire.

Figure 1:
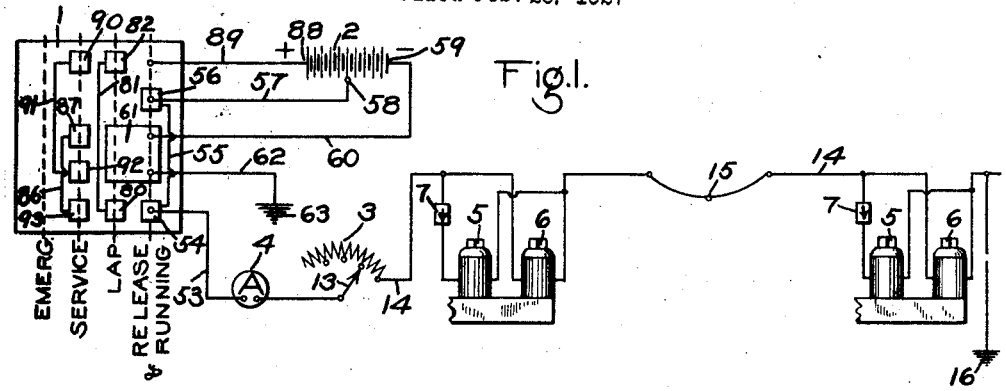

In the accompanying drawing; Fig. 1 is a diagrammatic view of an electrically controlled brake equipment, embodying my invention; and Fig. 2 is a sectional, diagrammatic view of the pneumatic equipment employed on the locomotive and each car in the train, and having associated therewith the electric controlling means.

As shown in Fig. 1 of the drawing, the electric equipment on the locomotive comprises a brake switch device 1, a battery or other source of direct current supply 2, a rheostat device 3, and an ammeter 4. The locomotive and each car of the train are equipped with magnet valve devices 5 and 6 and a rectifier device 7, all connected to a single train wire 14.

Figure 2:
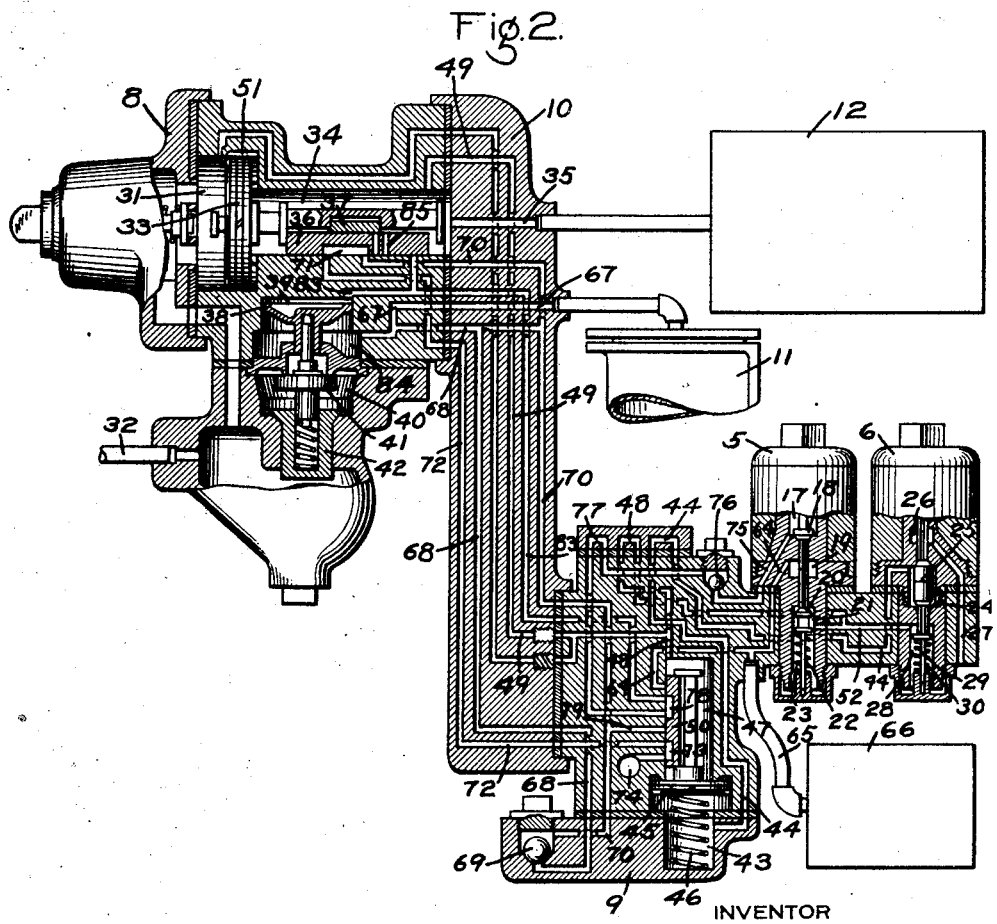

As shown in Fig. 2 of the drawing, the magnet valve devices 5 and 6 are employed in connection with a pneumatic valve device, which may comprise a triple valve portion 8, a selector valve portion 9, a pipe bracket 10, a brake cylinder 11, and an auxiliary reservoir 12.

The brake switch device 1, shown in development form in Fig. 1, may comprise a contact drum, adapted to be rotated through the various positions to effect the electrical connections shown for each position and is adapted to be operated independently, while the usual automatic brake valve device remains in the running position.

The rheostat device 3 may comprise the usual resistance coils and a contact arm 13 adapted to be turned to control the amount of resistance cut into the train line circuit, so as to permit a predetermined current flow, according to the length of the train.

A single train wire 14 extends through the train and is connected between cars and between the locomotive and first car by a suitable electrical connector or jumper 15, and at the end of the train the single train wire is grounded at 16.

Connected in parallel to the train wire are the magnet valve devices 5 and 6 on the locomotive and each car.

The magnet valve device 5 comprises a casing containing a magnet and having a chamber 17 containing a valve 18, said valve having a fluted stem extending through a bore in the wall of the casing and engaging in chamber 19 the stem of a valve 20 contained in chamber 21. Also contained in chamber 21 is a collared stem 22, held in engagement with the valve 20 by the pressure of a spring 23, against the collar of stem 22.

The magnet valve device 6 comprises a magnet and has a chamber 24 containing a double beat valve 25. The upper valve has a fluted stem extending through a chamber 26, which is connected to the atmosphere through passage 27, while the lower valve has a fluted stem extending into a chamber 28 and engaging the collar of a stem 29, acted upon by the pressure of a spring 30. The winding of the coil in the magnet 5 is such that it will become energized to operate the valves 18 and 20 on a lower current flow than is required in the magnet 6 to operate the valve 25.

Interposed in the circuit only with each magnet valve device 5 is a rectifier device 7, adapted to permit the flow of current only in one direction, as is indicated by the arrow on the device.

The pipe bracket 10 has two faces, against which the triple valve device 8 and selector valve device portion 9 are secured, and connected to passages in said bracket are the usual brake cylinder 11 and the auxiliary reservoir 12.

The triple valve device 8 comprises a casing having a piston chamber 31 connected to the brake pipe 32 and containing a piston 33, and a valve chamber 34 connected through passage 35 to the auxiliary reservoir 12 and containing a main slide valve 36 and an auxiliary slide valve 37, adapted to be operated by said piston.

The triple valve also has a quick action portion, comprising a quick action portion 38, contained in chamber 39, and a chamber 40 containing a brake pipe vent valve 41, adapted to be operated by said piston. Also contained in chamber 40 is the usual check valve 42.

The selector valve portion comprises a casing having a bracket on which the magnet valve devices 5 and 6 are mounted and having a piston chamber 43 connected through passage 44 to the double beat valve chamber 24 and containing a piston 45 and a spring 46 acting on said piston, and a valve chamber 47 connected through passages 48 and 49 to valve chamber 34 of the triple valve device and containing a slide valve 50 adapted to be operated by said piston.

In operation, the fluid pressure brake system is charged in the usual manner and fluid from the brake pipe 32 flows to piston chamber 31 and thence through the feed groove 51 to the valve chamber 34 and through passage 35 to the auxiliary reservoir 12, charging said chamber and reservoir.

Fluid at auxiliary reservoir pressure in valve chamber 34 is supplied through passages 49 and 48 to the selector valve chamber 47 and from passage 48 through passage 52 to the spring chambers 21 and 28 of the magnet valve devices 5 and 6, respectively.

The rheostat 3 is adjusted to permit the predetermined required degree of current flow in the train wire, as determined by the train length and as indicated by the ammeter 4.

With the brake switch 1 in the combined release and running position, the train wire 14 is connected through the rheostat 3, the ammeter 4 and wire 53 to the contact 54 on the brake switch drum, and thence through wire 55, contact 56, and wire 57, to the terminal 58 of the battery 2. The circuit is then completed through the negative pole 59 of the battery, wire 60, drum contact 61, wire 62 and the ground 63 on the locomotive. The train wire 14 is grounded at 16 at the end of the train.

Under these conditions, only a portion of the battery is cut into the circuit, and with the positive pole connected through the brake switch to the train wire 14, the current flows through the rectifier devices 7 and the magnets 5, energizing said magnets. The current strength, under these conditions, is insufficient to cause the magnets 6 to operate and shift the double beat valve 25 to the lower position.

With the double beat valve 25 in its upper position, thereby closing communication between chambers 24 and 26 and opening communication between chambers 28 and 24, fluid under pressure in chamber 28 is permitted to flow through chamber 24 and passage 44 to the selector piston chamber 43. The fluid pressures then equalize on opposite sides of the selector piston 45, so that the pressure of spring 46 holds said piston and slide valve 50 in the upper or release position, as shown in the drawing.

The magnet 5 being energized, operates to seat the valve 18 and unseat the valve 20, which permits the flow of fluid under pressure from chamber 21, through chamber 19 to passage 64 and thence through pipe 65 to the reservoir 66, charging said reservoir to the pressure in the selector valve chamber 47. Passage 64 also leads to the seat of the selector slide valve 50, but is lapped in release position of the slide valve.

With the selector piston 45 and slide valve 50 in release position, the brake cylinder 11 is vented to the atmosphere by way of passages 67 and 68, past the ball check valve 69, through passage 70, cavity 71 in the triple valve slide valve 36, passage 72, cavity 73 in the selector slide valve 50 and to the atmospheric exhaust port 74. To effect a service application of the brakes, the brake switch device 1 is turned to service position, in which a circuit is completed from the train wire 14, through the rheostat 3, ammeter 4, wire 53, brake drum contact 93, wire 86, contact 87 and wire 60 to the negative pole 59 of the battery 2, through the battery to the positive pole 88, wire 89, contact 90 on the drum, wire 91, contact 92 and wire 62 to the ground 63, the train wire 14 at the rear of the train being grounded at 16. Current from the full battery is thus supplied to the train wire 14 and is sufficient to energize the magnets 6. Since the negative pole 59 of the battery 2 is connected through the brake switch 1 to the train wire 14, the direction of current flow is opposite to that permitted through the rectifier 7, as indicated by the arrows, so that magnets 5 are deenergized.

Energization of the magnet 6 operates to shift the double beat valve 25 to its lower position and close communication between chambers 24 and 28 and connect chamber 28 to chamber 26 and thus passage 27 to the atmosphere. Chamber 24 being connected through passage 44 to the selector piston chamber 43, the fluid under pressure in said chamber is vented to the atmosphere which permits the higher pressure in valve chamber 47 to shift the piston 45 and slide valve 50 to the lower or service position, in which the brake cylinder passage 72 is lapped by the slide valve 50, and the passage 64 is uncovered by said slide valve, and thus connected to the chamber 47.

The magnet 5 being deenergized, the pressure of spring 23 seats the valve 20 and unseats the valve 18, which permits fluid at auxiliary reservoir pressure in the triple valve slide valve chamber 34 to flow to the brake cylinder 11 by way of passages 49 and 48, selector slide valve chamber 47, passage 64, chamber 19, past the valve 18, chamber 17, passage 75, past the ball check valve 76, through passage 77, cavity 78 in the selector slide valve 50, passages 79, 70, 68 and 67, thereby applying the brakes.

If it is desired to limit the degree of brake cylinder pressure and therefore the degree of brake application, the brake switch 1 is turned from service to lap position, when the desired brake cylinder-pressure is obtained.

In lap position of the brake switch 1, a circuit is completed from the train wire 14, through the rheostat 3, the ammeter 4, wire 53, drum contact 80, wire 81, drum contact 82, wire 69, battery 2, wire 60, drum contact 61, wire 62 to ground 63.

Current at full battery strength is thus supplied to train wire 14 in the direction to permit flow of current through the rectifier 7 to the magnet 5.

The full battery current being sufficient to energize the magnet 6, both magnets 5 and 6 are energized in lap position.

The magnet 6 being energized maintains the double beat valve 25 in the lower position, thereby connecting the selector piston chamber 43 to the atmosphere and holding said piston and slide valve 50 in the lower or application position.

Energization of the magnet 5 operates to unseat the valve 20 and seat the valve 18, so as to prevent further flow of fluid under pressure from chamber 19 through chamber 17 and to the brake cylinder 11, as hereinbefore described. Therefore, with the brake switch in lap position, the brake cylinder pressure will neither be increased nor decreased.

By alternately moving the brake switch between service and lap positions, the brake cylinder pressure may be increased in steps, as will be evident.

To release an application of the brakes, the brake switch 1 is turned to the release and running position, in which the magnets 5 becomes energized, but the magnets 6 remain in the deenergized position, as hereinbefore described.

Energization of the magnet 5 unseats the valve 20 and seats the valve 18, so as to prevent further flow of fluid under pressure from chamber 19 to chamber 17 and thence to the brake cylinder. The magnet 6 being in the deenergized position, the pressure of spring 30 seats the double beat valve 25 in its upper position. in which fluid under pressure is permitted to flow from chamber 28 through chamber 24 and passage 44 to the selector piston chamber 43 and equalize with the pressure of the fluid in the selector valve chamber 47. When the pressures become equal on opposite sides of the selector piston, the pressure of spring 46 shifts said piston and slide valve 50 to the upper or release position, in which the brake cylinder passage 72 is connected to the atmosphere through cavity 73 and the exhaust passage 74, thereby permitting a release of the brakes.

If it is desired to graduate the release of the brake cylinder pressure, the brake switch 1 is moved from the release and running position to lap position, when the desired decrease in brake cylinder pressure is obtained.

In lap position, the magnet 5 remains energized while the magnet 6 also becomes energized and operates to vent fluid from the selector piston chamber 43 to the atmosphere, so that the selector piston and slide valve are then shifted downwardly to application position, in which the brake cylinder passage 72 is lapped by the selector slide valve 50, thereby preventing a further decrease in the pressure of the brake cylinder fluid.

Thus to secure a graduated release of the brakes, the brake switch may be alternately moved from release and running position to lap position, as will be evident.

To effect an emergency application of the brakes, the brake switch 1 is turned to emergency position, in which the train wire circuit is broken, thereby causing both magnets 5 and 6 to be deenergized.

The magnet 6 being deenergized, the double beat valve 25 is in its upper position, so that fluid under pressure is supplied to the selector piston chamber, thereby permitting the spring 46 to hold the selector piston 45 and slide valve 50 in release position. The magnet 5 being deenergized, the valve 20 is seated and the valve 18 is unseated, so that the fluid under pressure in the reservoir 66 is supplied to the quick action piston 38 by way of pipe 65, passage 64, chamber 19, past valve 18, chamber 17, passage 75, past ball check valve 76, passage 77, cavity 78 in the selector slide valve 50, and passage 83 to the quick action piston chamber 39.

The quick action piston 38 is thereby operated to open the brake pipe vent valve 41 and vent the fluid under pressure in chamber 40 into chamber 84 and thence through passage 67 to the brake cylinder 11. The pressure of the fluid in the brake pipe 32 then being higher than the pressure in chamber 40 lifts the check valve 42, and said fluid then flows through chambers 40 and 84 to the brake cylinder and thus causes a sudden local drop in brake pipe pressure, which causes the triple valve piston 33 and slide valves 36 and 37 to be shifted to emergency position. In emergency position, port 85 in the main slide valve 36 registers with the brake cylinder passage 70, so that fluid under pressure in valve chamber 34 and the auxiliary reservoir 12 is permitted to flow through port 85 to passage 70 and thence through passages 68 and 67 to the brake cylinder 11, thereby applying the brakes in emergency.

It will be noted that to effect an emergency application of the brakes, the train circuit is opened. This is very desirable, since if the electric supply should fail from any cause or the train wire should become broken, an emergency application of the brakes will be automatically effected in the same manner as above described irrespective of the position of the brake switch 1.

When an electric service application of the brakes is effected, the fluid under pressure employed to apply the brakes is taken from the triple valve chamber 34 and auxiliary reservoir 12 by way of passage 49. The usual automatic brake valve device being normally in running position during electric operation, permits the maintenance of brake pipe pressure at the adjustment of the feed valve device. Therefore, although the pressure in the valve chamber 34 and the auxiliary reservoir 12 tends to be reduced, the pressure in the auxiliary reservoir is substantially maintained by flow from the brake pipe through the usual feed groove 51, around the piston 33.

If a car equipped with the above described apparatus is placed in a train not provided with electric control, the magnets 5 and 6 will both be deenergized, so that the valve 20 will be seated, cutting off the supply of fluid from the brake pipe to the reservoir 66, while the valve 18 will be opened, and fluid in said reservoir will be vented to chamber 39 above the quick action piston 38 and thence to the brake cylinder in the usual manner.

Since there is no fluid pressure in the reservoir 66 under the above conditions, there will be no action of the electric portion, and the equipment of the train will act only pneumatically in the usual manner.

Having now described my invention, what I claim as new and desire to secure by Letters Patent, is:—

1. In an electrically controlled brake, the combination with a single train wire, of groups of electrically controlled devices for controlling the brakes, the devices of each group being connected in parallel with said train wire and the groups being connected in series in said wire.

2. In an electrically controlled brake, the combination with a single train wire, of pairs of electrically controlled devices for controlling the brakes, the devices of each pair being connected in parallel with said train wire and the pairs of devices being connected in series in said wire.

3. In an electrically controlled brake, the combination with a single train wire, of pairs of electrically controlled devices for controlling the brakes, means in circuit with one device of each pair for preventing flow of current through said device in one direction, the devices of each pair being connected in parallel with said train wire and the pairs of devices being connected in series in said wire.

4. In an electrically controlled brake, the combination with a single train wire, of pairs of electrically controlled devices for controlling the brakes, means in circuit with one device of each pair for preventing flow of current through said device in one direction, the devices of each pair being connected in parallel with said train wire and the pairs of devices being connected in series in said wire, means for supplying current to said train wire in either direction of flow, and means for regulating the rate of current flow to provide the same current flow regardless of the length of the train.

In testimony whereof I have hereunto set my hand.

THOMAS H. THOMAS.